(Model.)
J. TAYLOR.
Rice Drill.
No. 236,734.                    Patented Jan. 18, 1881.
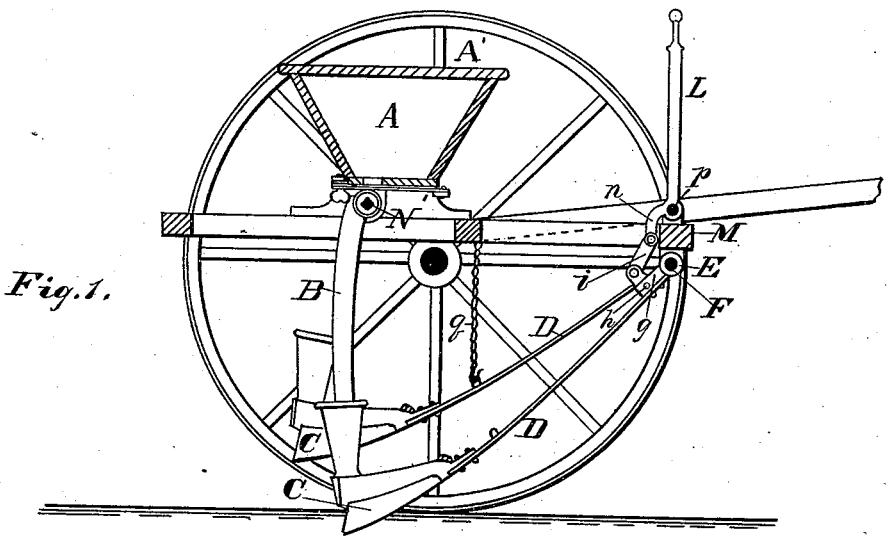
Fig. 1.
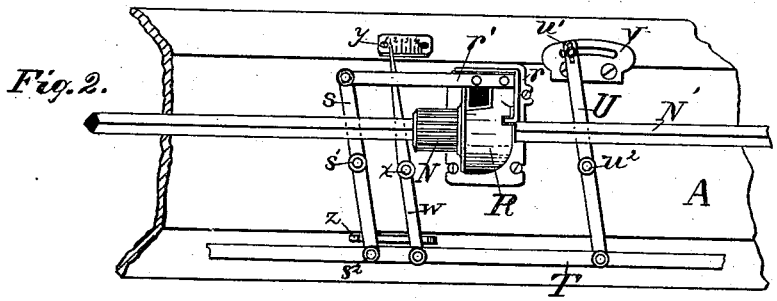
Fig. 2.
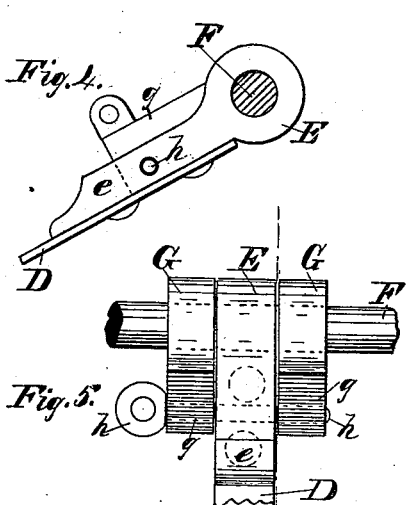
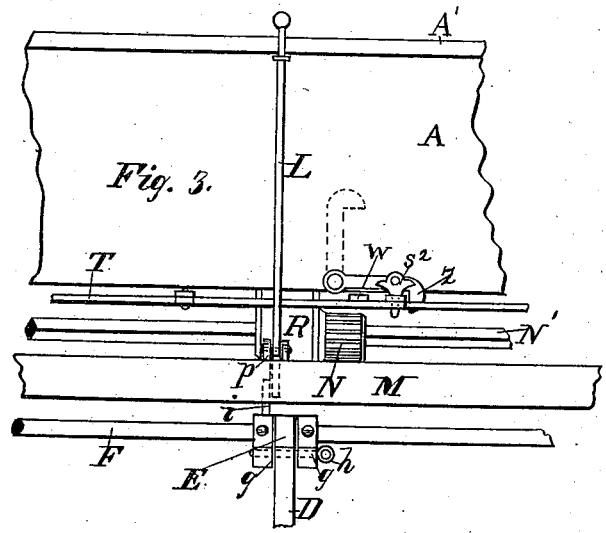
Witnesses:
Geo. A. Boyden,
A. C. Eader
Inventor:
James Taylor
By his Atty
Chas. B. Mann

UNITED STATES PATENT OFFICE.

JAMES TAYLOR, OF LOUISVILLE, KENTUCKY.

RICE-DRILL.

SPECIFICATION forming part of Letters Patent No. 236,734, dated January 18, 1881.

Application filed September 29, 1880. (Model.)

*To all whom it may concern:*

Be it known that I, JAMES TAYLOR, a citizen of the United States, residing at Louisville, in the county of Jefferson and State of Kentucky, have invented certain new and useful Improvements in Rice-Drills; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain improvements in grain-drills adapted especially for planting rice, and will first be described, and then designated in the claims.

The invention, in part, relates to that class of drills wherein each of the plow-shoes which make the furrows are attached to a spring-bar.

In the drawings hereto attached, Figure 1 is a side elevation, partly in section, of a drill, showing part of my improvements. Fig. 2 is a bottom view of the hopper-box. Fig. 3 is a front view of the hopper and means for separately moving the plow spring-bar. Fig. 4 is a side view, on larger scale, of the means for attaching the spring-bar. Fig. 5 is an inverted plan view of same.

In rice-drills it is deemed requisite that each spring-bar and its attached plow of a gang should work independent of all the others, and the providing of means for the accomplishment of this result constitutes one feature of my invention.

The letter A designates the hopper; A', its cover; B, the feed-tube, leading from the feed device in the bottom of the hopper; and C the plow, of which generally four are used, in practice, about fifteen inches apart, though there may be as many as desired. Each plow is attached to one end of a spring-bar, D, the other end of which is fastened to a projection, $e$, on an iron eye, E, which is slipped on the end of a round rod, F, extending crosswise of the forward part of the frame in such manner as to be loose thereon.

Secured to the round rod, by a set-screw or otherwise upon each side of the loose eye, is a casting, G, which has a short projection, $g$. A pin-hole is made and extends in the direction of the shaft F through both projections $g$, and also through the projecting part $e$ of the eye E, and a pin, $h$, may be passed through all three of the said parts to secure the spring-bar rigidly to the rod F. In this position the spring-bars serve to hold the plows to the ground.

To the upper side of one of the projections $g$ one end of a link, $i$, is pivoted, the other end being connected by a pivot-joint to the short arm $n$ of a hand-lever, L, whose fulcrum or pivoting-point $p$ is on a cross-bar, M, directly above the rod F.

Chains $q$ are attached to the frame, one hanging therefrom directly above each of the spring-bars. Each chain serves to suspend one of the bars, as seen in Fig. 1, when the plow to which it is attached is not in use. To have a plow suspended in this manner it is first necessary to withdraw the pin $h$ to disconnect the plow from the gang. When the pin is withdrawn the plow is easily raised, as the eye E will then turn on the rod. The one lever, L, when turned down forward, will raise all the plows whose pins $h$ are not withdrawn.

The adjustable feed device consists of a fluted roll, N, which will turn with the shaft N', and is adapted to be moved lengthwise of the shaft, so as to adjust the feed-opening. The fluted roll is shown in the drawings as moved to one side and entirely out of the case R, which incloses the passage for the grain. In this position the feed is entirely shut off. When the roll is moved along the shaft N', so as to be nearly inclosed within the case R, the feed is all on, or the grain-passage from the hopper is open.

Projecting through the case R, on the side opposite that at which the fluted roll projects, and connected with the fluted roll, is an L-shaped piece, $r$, to which a bar, $r'$, is bolted. The end of this bar is connected to one end of a lever, S, which is pivoted at S' to the under side of the hopper. The other end of the lever projects in front of the hopper and has a hole for a pin, $S^2$.

A movable bar, T, extends the whole length of the front side of the hopper, and is provided at a proper point, near each feed device, with a hole for the pin $S^2$, whereby each lever S, which adjusts the feed device, is connected.

Projecting at the back of the hopper is the end of the feed-adjusting lever U, which carries a set-screw, $u'$, that moves in a slotted plate, $v$, to which the set-screw may be tightened. The adjusting-lever is pivoted at $u^2$, on the under side of the hopper, and its front end is connected to the movable bar T.

It will be seen that the movement of the adjusting-lever U will change all the feed devices whose levers S are in connection with the bar T.

An indicator-lever, W, is pivoted at $x$, and one end is connected to the lever T, while the pointer end projects at the rear side of the hopper and moves over a graduated plate, $y$, whereon are figures or marks to indicate the various quantities of grain to be sown to the acre.

The feed devices are connected and adjusted by first placing the pointer at the required figure on the plate $y$, tightening the set-screw $u'$, then moving the lever S of each feed device until its pin-hole coincides with the pin-hole in bar T, which operation shifts the fluted roll, and then securing these parts by the insertion of the pin $S^2$. A hook, Z, is provided, which, when dropped over the lever S, holds the lever in a shut-off position.

Having described my invention, I claim and desire to secure by Letters Patent of the United States—

1. In a grain-drill, the combination, as set forth, of a bar to which the drill-plow is attached, provided with an eye, E, a rod on which the eye may turn loosely, a casting, G, rigidly secured to the rod on each side of the eye, and the two castings connected by a pin, $h$, passed through the bar.

2. In a grain-drill, the combination, as set forth, of a bar to which the drill-plow is attached, provided with an eye, E, a rod on which the eye may turn loosely, means, substantially as described, for permitting the eye to turn loosely or be secured rigidly to the rod, and a lever, L, in connection with the rod for operating the plows, whose bars are secured rigidly to the rod.

In testimony whereof I affix my signature in presence of two witnesses.

JAMES TAYLOR.

Witnesses:
JOHN CALDWELL,
JAMES HOLSTEN.